June 7, 1960 L. A. ZALKIND 2,939,378
WITHDRAWABLE DUCT VENTILATING SYSTEM
Filed July 15, 1957 2 Sheets-Sheet 2
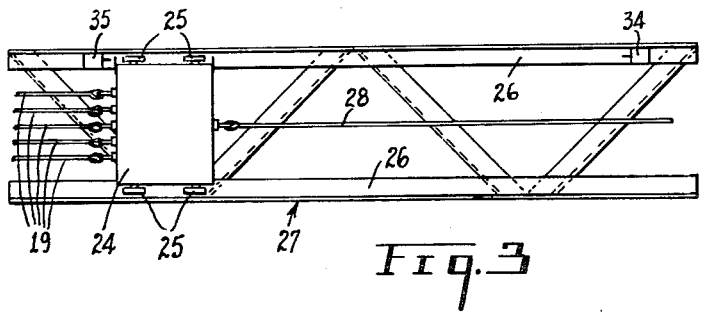
Fig. 3
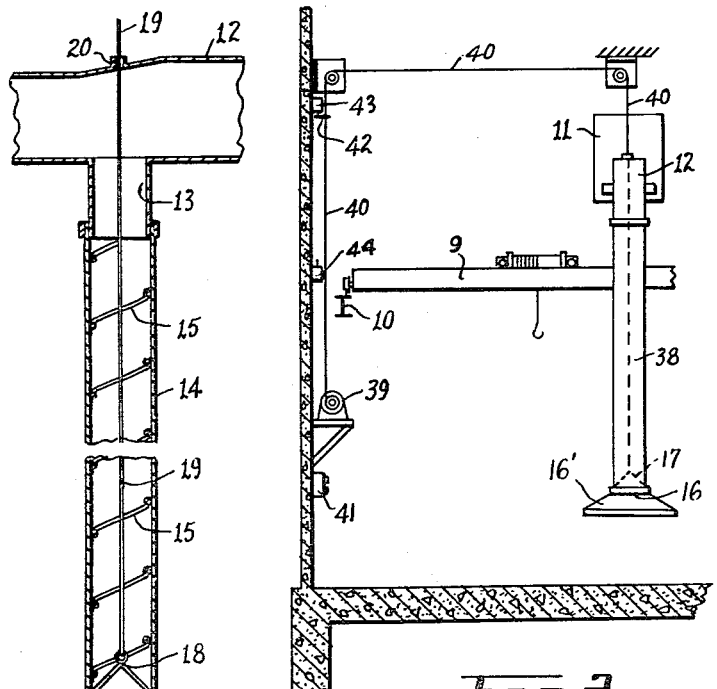
Fig. 4
Fig. 2
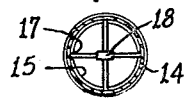
Fig. 5
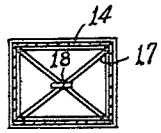
Fig. 6
INVENTOR
L. A. ZALKIND
By Fetherstonhaugh & Co.
ATTORNEYS

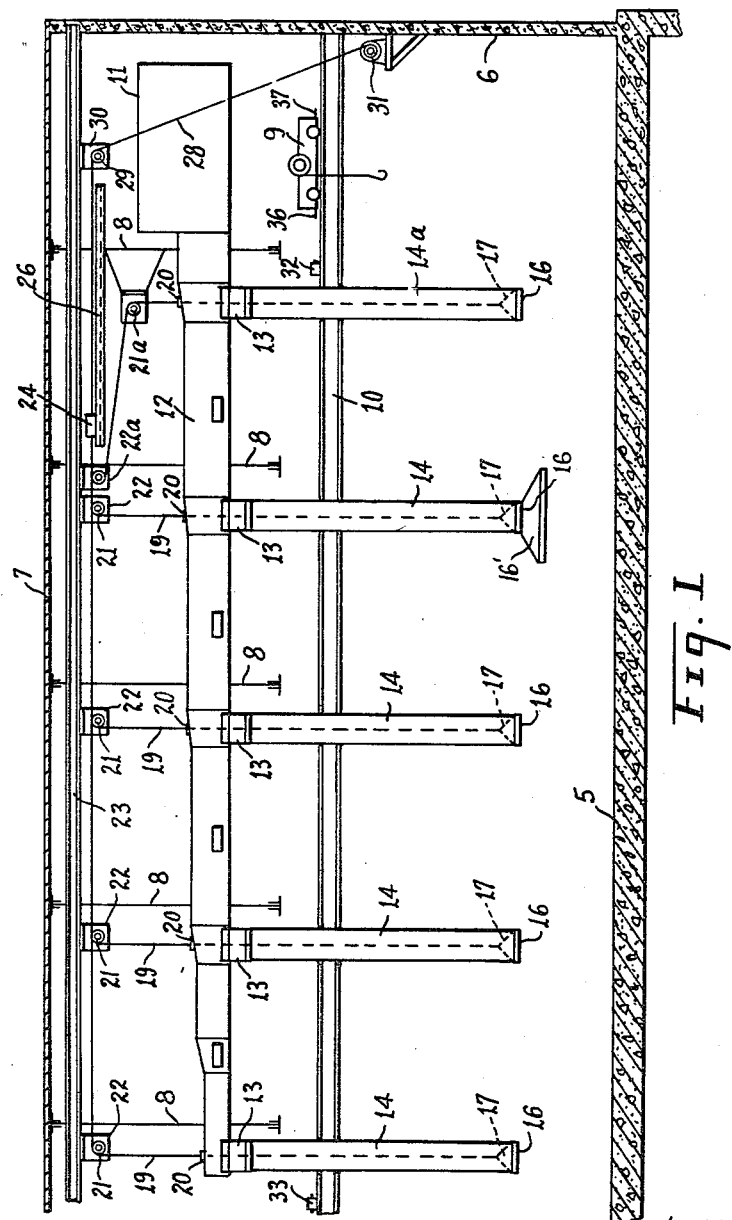

United States Patent Office 2,939,378
Patented June 7, 1960

2,939,378

WITHDRAWABLE DUCT VENTILATING SYSTEM

Louis Allen Zalkind, Toronto, Ontario, Canada, assignor to Libby Engineering Limited, Montreal, Quebec, Canada Filed July 15, 1957, Ser. No. 671,931

4 Claims. (Cl. 98—115)

This invention relates to the method of heating and ventilating large open space buildings and particularly to the method of directing fresh air, heated or otherwise, down to near floor level or for exhausting spent air or fumes from a building or equipment within the building, in which the ducts conducting the air or fumes can be withdrawn upwards in order not to interfere with the passage of travelling cranes or other equipment through the building.

The invention consists essentially of a main ventilating duct normally installed in the roof truss area of the building, and a series of collapsible ducts suspended from the main ventilating duct, the collapsible ducts being arranged to be withdrawn upwards, either as a group, automatically on the approach of equipment, such as a travelling crane, whose passage through the building would otherwise be obstructed by the suspended ducts, or each separate suspended duct can be withdrawn upwards to clear a specified area of the building in order that the floor in that area can be used as a temporary working space.

In large area buildings and particularly in paper machine rooms, satisfactory ventilation of the building presents serious problems in conveying fresh air to near floor level in the control area of the building or for exhausting spent air or fumes from a building or equipment within the building. Blower fans have been set up in the roof truss area, directing the fresh air downwards. In most cases this form of ventilation has not been satisfactory as the fresh air has to penetrate layers of vitiated air before reaching floor level, or is deflected by air currents away from its intended downward path. Again, such blower fans cause uncomfortable blasts of air to be directed into a relatively confined area before the air is eventually dissipated. Other methods have been used in which the air is ducted to near floor level at the sides of the building from where it is directed across the building. In wide buildings, such air is usually short circuited long before it can reach the central area of the building and, in the case of buildings housing large machines such as paper machines, these machines effectively block the air from reaching the central area of the building. Fixed ducts have been installed in the central area of large buildings but these have prevented the use of travelling cranes or means have had to be resorted to whereby sections of the fixed ducts can be dismantled or swing out of the way of such passing equipment.

The present invention has for its object the provision of means whereby fresh air, heated or otherwise, can be conveyed down to near floor level in the central area of large buildings without interfering with the use of equipment in the central area of the building.

A further object of the invention is to provide fresh air ventilation at or near floor level by means of ducting which can be withdrawn upwards without stopping the flow of fresh air through the ducting.

A further object of the invention is to provide a group of withdrawable ducts which can be withdrawn upwards as a group on the approach of moving objects which would otherwise be obstructed by the ducts.

A further object of the invention is to provide a group of withdrawable ducts which can be withdrawn upwards separately to allow the area in the vicinity of the separate ducts to be used as a temporary work space.

A further object of the invention is to provide withdrawable ducting in which the connections for withdrawing the ducts are concealed within the ducts.

These and other objects of the invention will be apparent from the following specification and the accompanying drawings, in which—

Figure 1 is a partial vertical longitudinal sectional elevation of a building showing a heating and ventilation system using withdrawable ducts operated as a group.

Figure 2 is a partial vertical cross sectional elevation of a building showing withdrawable ducts individually operated.

Figure 3 is a plan view of a travelling carriage assembly to which the main operating cable and the cables attached to the individual withdrawable ducts are attached in the manner shown in Figure 1.

Figure 4 is a vertical sectional view of a portion of the main duct and one of the withdrawable ducts in extended position.

Figure 5 is a horizontal cross section on the line 5—5 of Figure 4 showing the lower cable attachment.

Figure 6 is a horizontal cross section of a rectangular shaped withdrawable tube.

Referring to the drawings, the ventilating system hereinafter described can be installed in any type of building and is here shown as being installed in an open type building having a floor 5, an end wall 6, and a roof 7 supported on truss frames 8, leaving a large open space below the truss frames through which the travelling crane 9, supported on the side rails 10, can travel.

A main ventilating duct 11 feeds into the distributing duct 12 which is reduced in sectional area as it extends further away from the main duct 11. At spaced intervals along the length of the distributing duct 12 outlets 13 are provided. These outlets 13 are projected downwardly for a short distance. Secured to each of the outlets 13 is a collapsible duct 14 which can be made of any suitable material such as canvas, reinforced fibre, etc., which will readily collapse on itself. While retaining a substantial internal area through which air or fumes may pass. The walls of the collapsible duct 14 may be reinforced by the helical wire 15 which will assist the duct to collapse into regular folds, alternatively plain rings, not shown, could replace the helical wire 15. If air is to be fed into the building through the ducts 14 only, no special reinforcing, such as the helical wire 15, is necessary as the air flowing through the duct will keep the duct expanded whether it is in the extended or withdrawn position. However some such reinforcing is necessary should the system be used for exhausting air or fumes out of the building as the suction created would otherwise tend to collapse the walls of the duct against each other.

Secured to the lower open end 16 of each of the withdrawable ducts 14 is a duct spreader 17 which has a centrally disposed cable anchor 18. One end of the cables 19 is secured to the cable anchor 18 and the cables are passed upwards centrally in the ducts 14 and passed through the aperture 20 in the top surface of the distribution duct 12. The lower end of 16 of the withdrawable duct may be expanded in the form of a hood 16' or may be arranged to connect to a hood or such like structure fitted over a machine, tank or other structure.

In Figure 1 of the drawings each of the cables 19 are passed over the pulleys 21 which are mounted on the brackets 22 secured to the support member 23. The other end of each cable 19 is secured to the travelling carriage 24. This carriage 24 is provided with wheels 25 running on the members 26 of the frame 27 which, in turn, is suitably supported in the building framework. In order to accommodate the frame 27 in a suitable location in the building, the pulley bracket 22a is moved to the left out of line with the end duct 14a and an additional guide pulley 21a is provided to guide the cable central through the duct 14a. A cable 28 is secured at one end to the traveling carriage 24 and is passed over the pulley 29 on the bracket 30 and thence is wound on the winch 31 at its other end. The winch 31 is preferably power driven and is connected electrically with the limit switches 32, 33, 34 and 35. The limit switches 32 and 33 are mounted on one of the rails 10 on which the traveling crane 9 runs, and are of the double contact variety operating in the following manner.

Referring to Figures 1 and 3, the crane 9 is provided with suitable contact fingers 36 and 37 and as the crane 9 travels along the rails to the left the finger 36 makes contact with one of the buttons on the switch 32, causing the winch 31 to be energized and to wind up the cable 28, pulling the carriage 24 to the right and with it the cables 19 thereby lifting all of the ducts 14. As the carriage 24 travels to the right it makes contact with the limit switch 34 to stop the winch 31. When the crane 9 has passed the last of the raised ducts 14 it contacts the limit switch 33 causing the winch 31 to unwind and effect lowering of the ducts 14. When the ducts 14 are being lowered, the carriage 24 is travelling to the left and makes contact with the limit switch 35 thereby stopping the unwinding of the cable 28 from the winch 31. The location of the limit switches 34 and 35 on the framework 27 is such that the limit switch 34 will prevent the duct 14 from being raised too high against the outlet 13 of the distribution duct 12, while the limit switch will allow the ducts 14 to be lowered to their full extent without slack in the cables 19 and 27.

When the crane 9 is travelling in the reverse direction, to the right, the finger 37 makes contact first with the limit switch 33 to effect raising of the ducts 14 and then with the limit switches 32 to effect lowering of the ducts 14 with the limit switches 34 and 35 acting to stop the winch 31 as previously described.

In Figure 2 an arrangement is shown whereby individual ducts 38 can be raised and lowered by individual winches 39 through the cable 40. In this case the winch could be operated by the double switch 41 in which one button would effect raising of the duct 38 while the other button would effect lowering of the duct 38. Stopping of the raising and lowering of the duct 38 could be effected by stop push buttons but is preferably effected by the arm 42 affixed to the cable 40 making contact with either the limit switches 43 or 44. With such an individual arrangement for raising and lowering the ducts 38, the crane 9 can be moved into any position in the building and only the ducts 38 in the immediate vicinity of the crane need be retained in the raised position, all the others being lowered to near floor level for normal operation.

The ventilation of the building, either by supplying fresh air or evacuation of spent air or fumes, can be carried out without interruption regardless of whether the withdrawable ducts 14 or 38 are in the raised or lowered position or are in the process of being raised or lowered. No baffles or shut-off valves are required, nor does any part of the equipment have to be dismantled in order to allow the crane 9 to pass through the building.

It will be realized that in very long buildings separate groups of distribution ducts and their dependent flexible ducts may be installed, in which case any self containing group would have its own winch controlling switching arrangement, or there may be a combination of groups of ducting as shown in Figure 1 with other groups of single controlled ducts as in Figure 2, the arrangement of groups or single units depending greatly upon the type of work being carried on in any particular area of the building.

While a particular system of limit and stop switches are shown for the control of the raising and lowering of the ducts, it is to be realized that the system of raising and lowering the ducts is not dependent on the switching arrangement but could be carried out by other means such as by hydraulic means or by manual means.

By the use of a ventilating system as above described, near floor ventilation of large buildings can be accomplished without restricting the use of travelling cranes or the disposal of loads on any particular area of the floor of the building. Continuous ventilation of the building is carried on regardless of whether the collapsible ducts are in the lowered or raised position. The collapsible ducts, either individually or in groups can be protected against damage from travelling cranes or other types of moving loads, by the use of limit switches automatically raising and lowering these ducts when the crane or a load is being moved into the area of the ducts. Such an arrangement is particularly useful in bringing fresh air down to near floor level in the work passage of paper machine rooms, etc.

While the ducts are shown as being suspended from above with their lower ends hanging free, it is understood, particularly where the ducts are used in a suction ventilating system, that the lower ends of the ducts could be attached to hoods or other like structures designed to cover or enclose a machine, tank, vat or other source of dust, fumes, smoke, moisture, gas or any substance creating a nuisance, such hood being designed so it may either raise and lower with the withdrawable duct or be permanently attached in position so that the withdrawable duct may be readily connected to it as required.

What I claim is:

1. A withdrawable duct system for ventilating large open area buildings, comprising a main distributing duct extending along under the ceiling of said building, the said distributing duct having one or more outlets projecting downwardly therefrom, a collapsible duct formed from a continuous tube of flexible material secured to each of the outlets from said distribution duct, a helical wire frame supporting each of said flexible material ducts, constraining said collapsible ducts to fold upon themselves without appreciable reduction in their internal diameter when in the collapsed position, a duct spreader in the lower end of said collapsible ducts, a cable secured centrally to each of said duct spreaders and extending upwards through said collapsible ducts and distribution duct, a track structure located above said distribution duct a movable carriage supported on said track structure, said carriage providing an anchor for the ends of said cables remote from the said duct spreaders, a cable drum, and a cable connecting said carriage with said cable drum, the said cable drum when rotated moving said carriage along said track structure to effect raising and lowering of the said collapsible ducts.

2. A withdrawable duct system as set forth in claim 1 in which limit switches are located at either end of the said track structure limiting the travel of the said carriage on the frame.

3. A withdrawable duct system as set forth in claim 1 in which limit switches are mounted on the opposite walls of the building near or adjacent the group of collapsible ducts, the said limit switches when engaged by a load passing through the building will control the raising and lowering of the collapsible ducts to allow the passing load unobstructed passage through the building.

4. A withdrawable duct system as set forth in claim 1 in which a pair of limit switches are mounted in vertical spaced relation on a wall of the building adjacent the said collapsible ducts and a contact arm secured to the cable of each duct, adapted to engage the said limit switches to control the distance of rise and fall of the collapsible ducts, (References on following page)

References Cited in the file of this patent

UNITED STATES PATENTS

| | | |
|---|---|---|
| 358,674 | Kendall | Mar. 1, 1887 |
| 722,288 | Dickinson | Mar. 10, 1903 |
| 806,648 | Dickinson | Dec. 5, 1905 |
| 1,064,796 | Waller | June 17, 1913 |
| 2,575,841 | Rosli | Nov. 20, 1951 |
| 2,693,749 | Houdek | Nov. 9, 1954 |

FOREIGN PATENTS

| | | |
|---|---|---|
| 288,798 | Great Britain | Apr. 19, 1928 |
| 758,350 | Great Britain | Oct. 3, 1956 |